United States Patent [19]
Hart

[11] Patent Number: 5,497,536
[45] Date of Patent: Mar. 12, 1996

[54] CABLE HOSE HANDLING CHAIN

[75] Inventor: Anthony J. Hart, Nottingham, England

[73] Assignee: Mansign Engineering Limited, Nottingham, England

[21] Appl. No.: 340,219

[22] Filed: Nov. 16, 1994

[30] Foreign Application Priority Data

Nov. 17, 1993 [GB] United Kingdom ............... 932372

[51] Int. Cl.⁶ ........................... A44B 21/00; F16L 3/08
[52] U.S. Cl. ........................... 24/459; 248/74.1
[58] Field of Search ............... 24/459, 460, 338, 24/331, 115 G, 615, 30.5 L, 30.5 W, 30.5 P; 248/74.1, 74.3, 74.2, 51, 76, 316.7; 403/381

[56] References Cited

U.S. PATENT DOCUMENTS

| | | | |
|---|---|---|---|
| 3,279,014 | 10/1966 | Fischer | 24/115 G |
| 3,421,187 | 1/1969 | Ryder | 248/74.3 X |
| 3,757,031 | 9/1973 | Izraell | 24/459 X |
| 4,029,277 | 6/1977 | Bulanda | 248/74.1 |
| 4,118,838 | 10/1978 | Schiefer et al. | 24/115 G X |
| 4,379,536 | 4/1983 | Mizuno et al. | 24/459 X |
| 4,405,161 | 9/1983 | Young et al. | 24/459 X |
| 4,582,281 | 4/1986 | Van Camp | 248/51 |
| 4,775,121 | 10/1988 | Carty | 248/74.3 X |
| 4,840,023 | 6/1989 | Borsani | 248/51 X |
| 4,870,722 | 10/1989 | Shell, Jr. | 248/74.1 X |

*Primary Examiner*—Peter M. Cuomo
*Assistant Examiner*—Robert J. Sandy
*Attorney, Agent, or Firm*—Jones & Askew

[57] ABSTRACT

In combination, a cable/hose retention clip and a chain link of a cable/hose handling chain, the chain link having a body including a top wall spaced from an opposed bottom wall by a side wall to define a compartment for housing a cable/hose and having an open side opposite said side wall through which the cable/hose may be inserted into the compartment, the clip being insertable into the compartment through said opening to an engaged position whereat the clip releasably engages with the top and bottom walls, wherein the clip is moulded from plastics and has a relatively rigid body portion and a pair of relatively flexible resilient arm portions depending therefrom, the body portion being arranged to extend between the top and bottom walls to close said open side when the clip is in said engaged position, said arm portions having latch formations co-operable with latch formations on the top and bottom walls for restraining withdrawal of the clip through said open side from the engaged position, the rigid body portion being connected to the top wall and bottom wall by inter-engaging formations which co-operate to restrain outward displacement of the top and bottom walls from one another.

8 Claims, 3 Drawing Sheets

CABLE HOSE HANDLING CHAIN

The present invention relates to a cable hose handling chain and to a chain link therefore.

In particular, the present invention relates to a cable handling chain of either of type referred to as a side pull chain (an example thereof is shown in UK Patent 1441362) or as a centre-pull chain (an example thereof is shown in UK Patent 2208129).

A cable handling chain is usually an assembly of pivotally attached chain links each including a body having a side wall, a top wall and a bottom wall which together define an open sided compartment for housing cable/hoses.

In use, cables/hoses are fed into the compartment of each link through its open side and are normally retained within the link by means of a generally U-shaped clip which engages with the top and bottom walls.

Desirably the chain link and U-shaped clip are moulded from a suitable plastics material. An example of such a plastics chain link and U-shaped clip is disclosed in our UK Patent/Specification 2257492.

A problem associated with forming the chain link from plastics material is that in use the upper and lower walls of the link may distort due to loadings imposed by the housed cables causing an outward displacement of the upper and/or lower wall. This may occur particularly in those regions of the chain which are looped. This distortion may lead to disengagement of the clip and consequential dislodgement of the housed cable. It is desirable therefore that the chain link is dimensionally stable during use.

According to one aspect of the present invention there is provided, in combination, a cable/hose retention clip and a chain link of a cable/hose handling chain, the chain link having a body including a top wall spaced from an opposed bottom wall by a side wall to define a compartment for housing a cable/hose and having an open side opposite said side wall through which the cable/hose may be inserted into the compartment, the clip being insertable into the compartment through said opening to an engaged position whereat the clip releasably engages with the top and bottom walls, wherein the clip is moulded from plastics and has a relatively rigid body portion and a pair of relatively flexible resilient arm portions depending therefrom, the body portion being arranged to extend between the top and bottom walls to close said open side when the clip is in said engaged position, said arm portions having latch formations co-operable with latch formations on the top and bottom walls for restraining withdrawal of the clip through said open side from the engaged position, the rigid body portion being connected to the top wall and bottom wall by inter-engaging formations which co-operate to restrain outward displacement of the top and bottom walls from one another.

Preferably the inter-engaging formations also co-operate to restrain inward displacement of the top and bottom walls toward one another.

Preferably the clip and chain link body have inter-engaging stop means which co-operate to limit the amount by which the clip can be inserted into the compartment.

Preferably the inter-engaging formations comprise a channel formed in the top and bottom wall and a rigid projection formed on opposed walls of the body portion of the clip, the cross-sectional shape of each cooperating channel and projection being such as to resist lateral movement of the projection out of the channel. Preferably, each channel and projection is of dove-tail cross-section.

Preferably the channel is open bottomed and the rigid projection extends for substantially the entire thickness of the wall in which the channel is formed.

Preferably the rigid body portion of the clip includes opposed upper and lower walls from which respective resilient arm portions depend and a side wall extending between the upper and lower walls. Preferably the side wall of the body portion is curved in the longitudinal direction of the link. The curved wall defines a deflection shield against snagging and also serves to rigidify the body portion. Preferably one or more reinforcing ribs are provided between the upper, lower and side walls for rigidifying the body portion.

Advantageously the channels on both the lop and bottom walls have inwardly extending portions which slidingly receive the arm portions and serve as guides during insertion of the clip to its engaged position, said rigid projections being defined as extensions to said arm portions.

According to a further aspect of the invention there is provided a cable/hose handling chain including chain links and retention clips defined above.

Various aspects of the present invention are hereinafter described with reference to the accompanying drawings, in which.

Figures 1, 2:
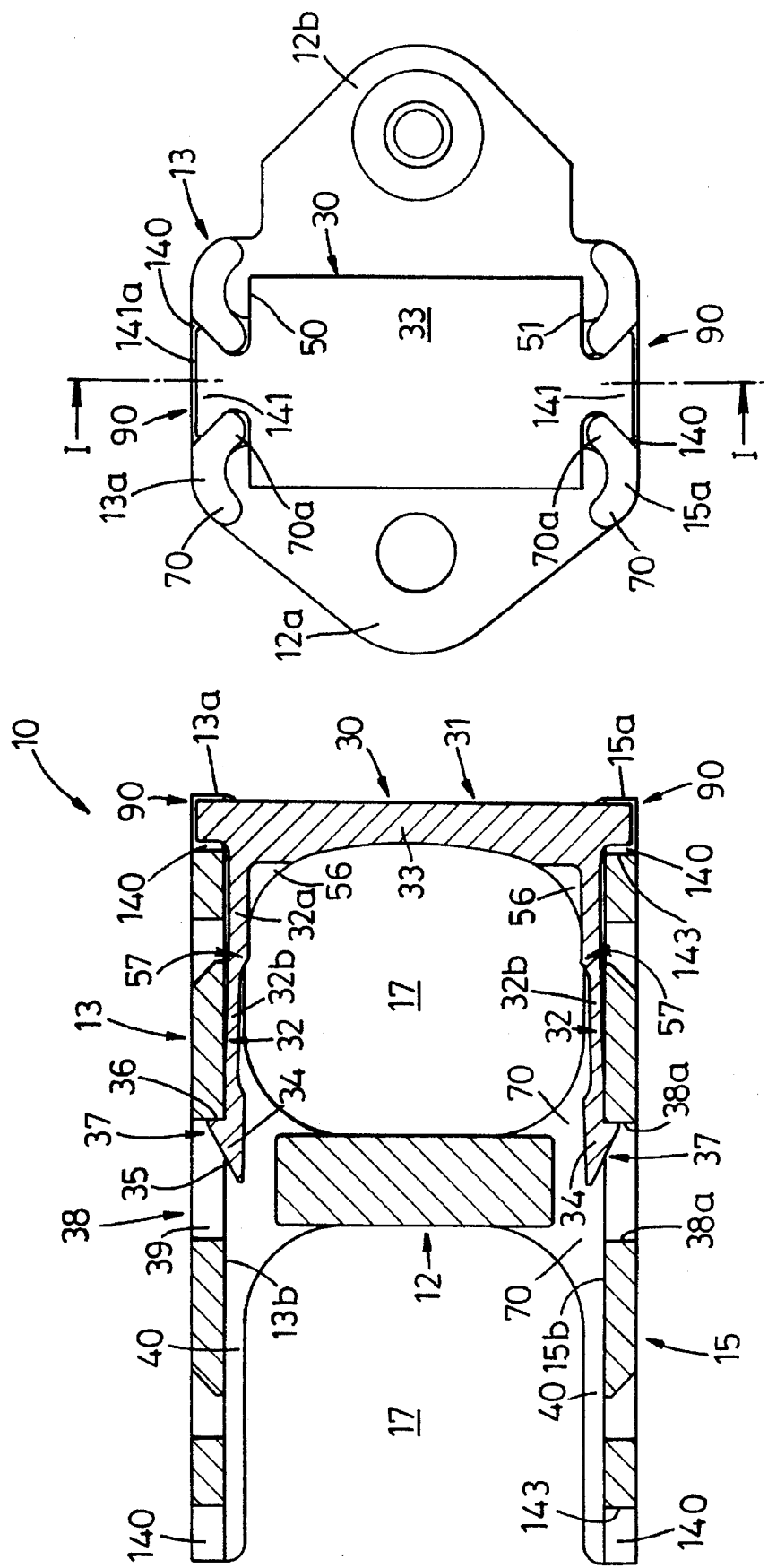
FIG. 1 is a side sectional view along line I—I in FIG. 2 of a chain link and clip combination according to a first embodiment of the present invention.
FIG. 2 is an end view of the embodiment shown in FIG. 1.
Figure 3:
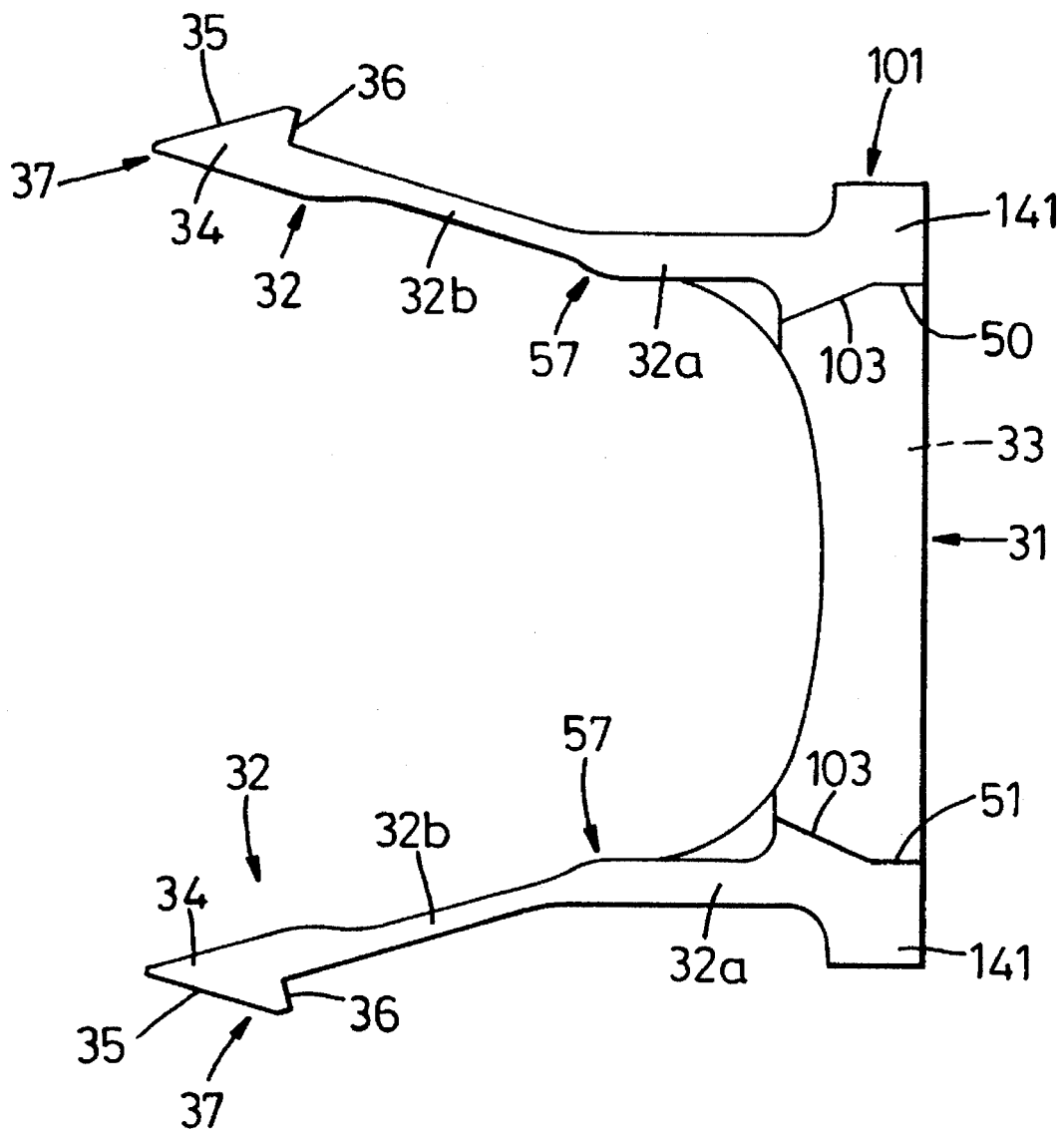
FIG. 3 is a side view of the clip in FIGS. 1 and 2 when removed from the chain link and is in a relaxed condition.

Referring initially to FIGS. 1 and 2 there is shown a centre pull type chain link 10 having a body defined by a side wall 12, a top wall 13 and a bottom wall 15. The side wall 12 has laterally extending projections 12a, 12b which are pivotally attachable to neighbouring links to form a chain in a known manner. The walls, 12,13 and 15 define therebetween a pair of open sided compartments 17 located either side of wall. 12 for housing cables/hoses 18.

The open side 20 of each compartment is defined between the terminal ends 13a, 15a of the top and bottom walls 13,15 respectively and, in use, is closed by a removable clip 30 which is insertable through the open side to be retained at an engaged position as illustrated in FIG. 1.

The clip 30 is preferably moulded in one piece from a resilient plastics material to include a relatively rigid body portion 31 having a pair of opposed resiliently detectable arms 32 depending therefrom.

The body portion includes opposed upper and lower walls 50,51 respectively between which extends a central wall portion 33. The upper and lower walls 50,51 inter-engage with the inner face of the top and bottom walls 13,15 respectively to retain lateral displacement of the top and bottom walls toward one another. The central wall portion 33 extends for the full height of opening 20 as defined between the terminal ends 13a, 15a.

The resiliently deflectable arms 32 each include a terminal latch formation 37 preferably in the form of head 34 having an inclined face 35 and a shoulder 36 which engages with co-operating latch formation 38 formed in a respective wall 13,15 of the link; the co-operating latch formation 38 preferably being in the form of an aperture 39 having a planar shoulder or face 38a which is substantially perpendicular to the inner face 13b or 15b of wall 13 or 15.

A guide channel 40 is preferably provided on the inner face of both the top and bottom walls 13,15 which extend from the aperture 39 to the terminal edges 13a, 15a respectively. The cross-sectional shape and size of the channels 40 and heads 34 are complementary so that during insertion and removal of a clip, the heads 34 are located in the channels and are guided toward or away from the latch formations 38. Preferably the heads 34 are of a rectilinear cross-section.

Preferably, each arm 32 includes a relatively rigid portion 32a connected to the body portion 31 and a relatively flexible portion 32b containing the head 34. The rigid portion 32a forms an extension of the upper or lower wall 50,51 respectively and, preferably, integral reinforcement ribs 56 are provided between the arm portions 32a and central wall portion 33 to help rigidify the arm portions 32a against inward deflection.

The relatively rigid portion 32a together with body portion 31 provides a rigid foundation for the arm portion 32b so that inward deflection is limited up to the junction 57 between the flexible and rigid portions 32a,32b respectively which means that the outward biasing force results primarily from the thickness of the material of the clip at junction 57 and also the effective length of arm portion 32b as defined by the position of junction 57. Accordingly a relatively high biasing force may be achieved.

Preferably the central wall 33 is curved in the longitudinal direction of the link 10. Such a shape is desirable as it acts as a shield against snagging and so reduces the likelihood of snagging during haulage of the chain and also provides rigidity to the body portion.

Preferably at least the outer profile of rigid portion 32a and more preferably the remainder of each arm 32b is in cross-section of a size and shape which is complimentary to that of the associated channel so that widen the clip is fully inserted, at least the outer portion of each arm 32 is located within a respective channel. In this way the majority of the length of each arm and associated channel co-operate to restrain twisting of the clip about an axis passing perpendicularly through walls 13,15 and parallel to side wall 12.

As seen clearly in FIG. 2, the upper and lower walls 50,51 project laterally beyond both sides of the arms 31 for a substantial distance. Accordingly twisting of the clip about an axis parallel to the direction of insertion is resisted by engagement between the marginal ends of walls 50,51 with the inner faces of walls 13,15 respectively.

As also seen in FIG. 2, the inner faces 13b,15b of the top and bottom walls have strengthening ribs 70 thereby providing an undulating profile, the side walls for each guide channel 40 for each wall 13,15 being defined by a central pair of ribs 70a.

Release of the clip from the link 10 can be achieved by pressing an implement through apertures 39 to deflect the arms 32 inwardly and permit withdrawal of the clip.

Alternatively, a special tool may be used as for example disclosed in our UK Patent Specification 2257492.

The top wall 13, bottom wall 15 and clip 30 are provided with inter-engaging formations 90 which co-operate to restrain outward lateral displacement of the top and bottom walls from one another.

In the illustrated embodiment the formations 90 comprise a channel 140 formed in each of the top and bottom walls and a rigid projection 141 projecting from each of the upper and lower walls 50,51 of body portion 33.

The projections 141 and channels 140 are each of dovetail cross-section and so interact to prevent lateral removal of a projection 141 from a channel 140. It will be appreciated that other cross-sectional shapes may be adopted to perform the same functions.

Preferably, as shown, the channel portion 140 is open bottomed and the rigid projection 141 extends for substantially the entire depth of channel portion 140. Preferably the height of the projection 141 is slightly less than the depth of the channel portion 140 so that the outer edge 141a of the projection lies below the outer surface of the associated wall 13 or 15.

Preferably each channel portion 140 defines an extension of a respective channel 40 and since the channel portion 140 is of greater depth than the remainder of the channel, a shoulder 143 is defined therebetween which may be engaged by the rigid projection 141 during insertion of the clip. The position of the shoulder is located in board of the position in which the projection 141 resides when the clip is in its engaged position and so serves to prevent the clip being inserted too far.

In addition, forming channel portion 140 as an extension to channel 40 enables the thickness of material forming ribs 70a to be utilised for accommodating the dove-tail channel shape and provide a depth of channel which is greater than the material thickness of the wall 13 or 15.

Preferably, the height of the rigid body portion 33 of clip 101 between the upper and lower walls 50,51 respectively is chosen to be equal to or preferably slightly greater than the minimum distance between the inner faces of the wails 13,15 adjacent to the terminal ends 13a, 15a. In this manner when the clip 101 is inserted into the chain link as seen in FIG. 2 the walls 13,15 engage with the rigid body 33 and are supported thereby. This in effect produces a box-like structure which is resistive to inward collapse. In addition, the body 33 defines the spacing between the walls 13,15 adjacent the terminal ends 13a, 15a and in so doing provides a consistent dimension for adjacent links. This is particularly advantageous in cases where the link is moulded from a plastics material. Preferably the body 33 is provided with inclined faces 103 adjacent to walls 50,51 in order to facilitate entry of the body 33 in between the walls 13,15.

Figure 4:
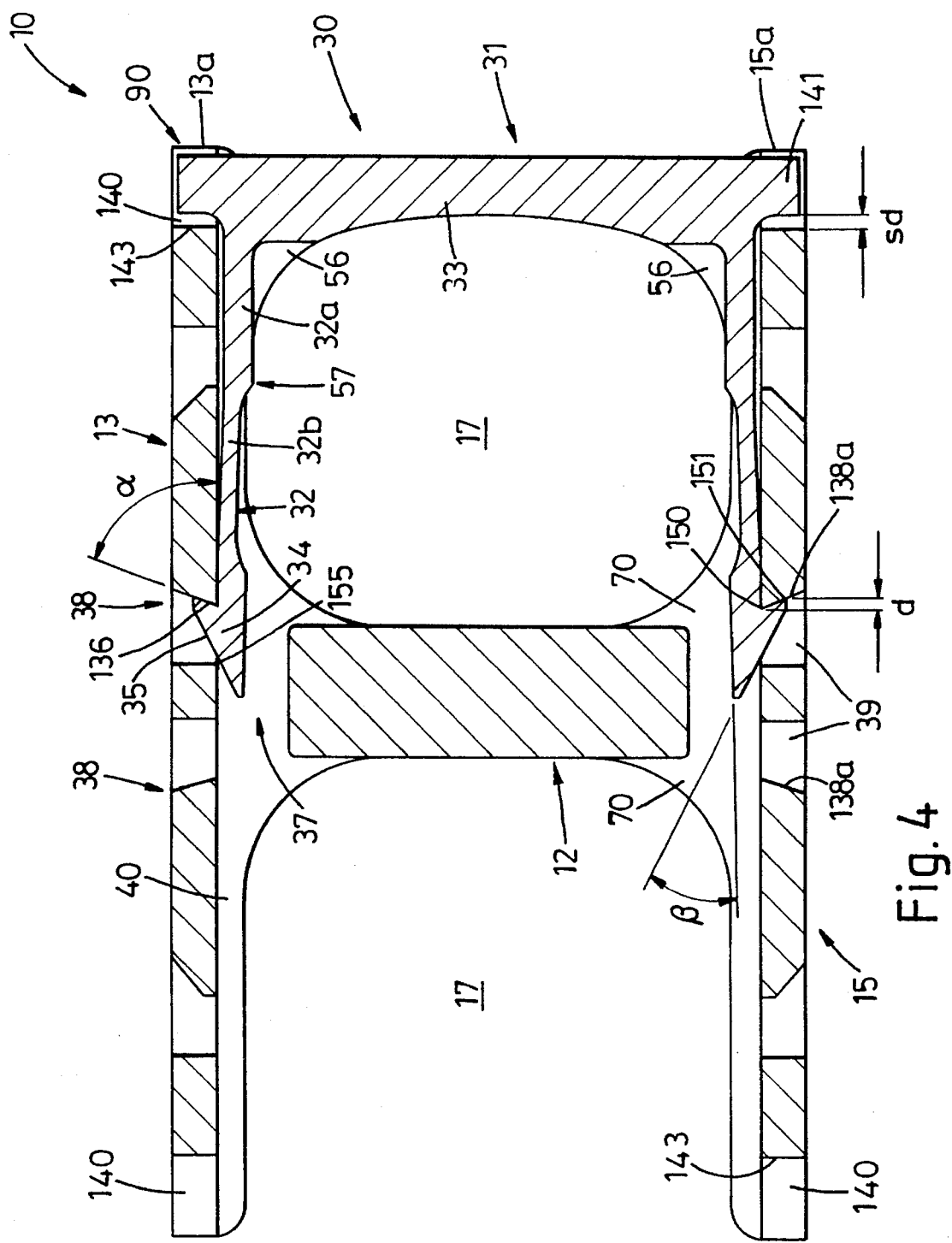
FIG. 4 is a side sectional view similar to FIG. 1 showing a second embodiment of the present invention.

A second embodiment is illustrated in FIG. 4 which is a modification of the first embodiment; accordingly, similar parts have been designated by the same reference numerals.

In the second embodiment, the clip 30 has been modified by the provision of an inclined shoulder 136 for co-operation with the latch formation 38. The latch formation 38 for the second embodiment has an inclined shoulder 138a for co-operation with inclined shoulder 136.

The inclination of the co-operative shoulders 136 and 138a is chosen such that, when inter-engaged as shown in FIG. 4, inward movement of the arms 32 relative to the walls 13 and 15 is resisted.

Preferably the angle of inclination $\alpha$ for both the shoulder 136 and 138a is in the range of 30 to 60°, preferably about 45°.

In order to enable the clip 30 to be retained within the chain link 10 it is necessary for the distance sd between projection 140 and stop shoulder 143 to be at least the same, preferably slightly greater than the distance d between the inner corner 150 of the shoulder 138a and the outer corner 151 of the shoulder 136 when inter-engaged as shown. In this way, the outer corner 151 is able to clear the inner corner 150 during insertion of the clip 30 and so enable the head 34 to move laterally outwardly into the aperture 39.

In order for the shoulders 136, 138a to fully engage as shown in FIG. 4, it is necessary for the clip 30 to move over the distance sd in an outwardly or retracted direction.

In order to envisage such movement, the distances between the opposed shoulders 138a and 138b of the aperture 39 is chosen such that the inclined face 35 is able to contact the inner corner 155 of the shoulder 138b when at a fully inserted position of the clip 30 whereat projection 140 contacts shoulder 143 to a partially retracted position and during movement of the clip 30 in its retract direction over at least the majority or all of the distance sd.

The angle of inclination β of the face 35 relative to the longitudinal line of insertion of the clip is chosen so as to act as a cam face for cooperation with the corner 155 such that outward movement of the arms 32 caused by their resilient bias causes the clip 30 to move in the retract direction from its fully inserted position. Preferably the angle β is in the range of 30° to 40°, and is preferably about 36°.

Preferably as shown, the head 34 has a longer longitudinal extent than the aperture 39 and the face 35 is in engagement with corner 155 when the shoulders 136 and 138a are fully engaged. In this way, the face 35 in co-operation with corner 155 serves to resiliently urge the shoulders 136 and 138a into engagement and thereby help resist inward movement of the arms 32 of the clip.

Although the retention clip 30 has been described above for use with a centre pull type of chain link it will be appreciated that it may be used with a side pull type chain link for example of the type described in UK Patent 1441362.

I claim:

1. In combination, a cable/hose retention clip and a chain link of a cable/hose handling chain, the chain link having a body including a top wall spaced from an opposed bottom wall by a side wall to define a compartment for housing a cable/hose and having an open side opposite said side wail through which the cable/hose may be inserted into the compartment, the clip being insertable into the compartment through said opening to an engaged position whereat the clip releasably engages with the top and bottom walls, wherein the clip is moulded from plastics and has a relatively rigid body portion and a pair of relatively flexible resilient arm portions depending therefrom, the body portion being arranged to extend between the top and bottom walls to close said open side when the clip is in said engaged position, said arm portions having latch formations co-operable with latch formations on the top and bottom wails for restraining withdrawal of the clip through said open side from the engaged position, the rigid body portion being connected to the top wall and bottom wall by inter-engaging formations which co-operate to restrain outward displacement of the top and bottom walls from one another.

2. The combination according to claim 1 wherein the inter-engaging formations also co-operate to restrain inward displacement of the top and bottom walls toward one another.

3. The combination according to claim 1 wherein the clip and chain link body have inter-engaging stop means which co-operate to limit the amount by which the clip can inserted into the compartment.

4. The combination according to claim 1 wherein the latch formations on the arm portions and the top and bottom walls are defined by inclined shoulders which co-operate when engaged to prevent withdrawal of the clip and resist inward deflection of the arms relative to the top and bottom walls.

5. The combination according to claim 4 wherein the arm portions include a terminal cam face engagable with the top and bottom walls to co-operate therewith to urge the clip in the withdrawal direction so as to urge said latch formations into contact.

6. The combination according to claim 1, wherein the inter-engaging formations comprise a channel formed in the top and bottom wall and a rigid projection formed on opposed walls of the body portion of the clip, the cross-sectional shape of each co-operating channel and projection being such as to resist lateral movement of the projection out of the channel.

7. The combination according to claim 6 wherein each channel and projection is of dove-tail cross-section. pg,16

8. The combination according to claim 1, wherein the rigid body portion of the clip includes opposed upper and lower walls from which respective resilient arm portions depend and a side wall extending between the upper and lower walls.

* * * * *